United States Patent Office 3,410,655
Patented Nov. 12, 1968

3,410,655
PRODUCTION OF ALPHA-CALCIUM SULFATE HEMIHYDRATE
Hermann Rüter, Ludwigshafen (Rhine), and Egon Cherdron and Fritz Fässle, Limburgerhof, Palatinate, Germany, assignors to Gebruder Giulini G.m.b.H., Ludwigshafen (Rhine), Germany
No Drawing. Filed Feb. 24, 1966, Ser. No. 529,632
Claims priority, application Germany, Apr. 24, 1965, G 43,435
10 Claims. (Cl. 23—122)

ABSTRACT OF THE DISCLOSURE

Alpha-calcium sulfate hemihydrate in the form of compact, non-needle-like crystals is obtained from calcium sulfate dihydrate, particularly by-product gypsum from wet process phosphoric manufacture, or from low-grade natural gypsum, by elutriating the dihydrate with water to remove organic impurities and fine and slimy crystal portions at about 60°–90° C., forming an aqueous suspension of the dihydrate at a pH about 1.5–6, and subsequently heating under closely controlled conditions.

---

The present invention relates to a novel method for the preparation of calcium sulfate hemihydrate. More particularly, the invention concerns the preparation of said hemihydrate in the form of compact, non-needle-like crystals from natural or synthetic gypsum.

Calcium sulfate hemihydrate, which finds use in the construction industry as plaster of Paris, exists in two modifications. The usual plaster of Paris modification is the beta-calcium sulfate hemihydrate, which is employed for making finished articles of gypsum, such as wall partitions, box boards, cover plates, and the like, as well as for coatings. The preparation of this beta-calcium sulfate hemihydrate is carried out either in directly heated calcining apparatus, such as, for example, rotary furnaces, multistoried kilns, or grinding and calcining systems, or else in indirectly heated pans or vessels, called gypsum cookers.

According to the manner of preparation, the plaster of Paris still contains more or less anhydrous calcium sulfate, and/or alpha-calcium sulfate hemihydrate, which impart to it definite properties. The consistency (ml. of water/100 grams plaster) or water absorptivity of such a beta-calcium sulfate hemihydrate lies in the order of about 80 to 100 ml. per 100 grams of plaster of Paris. Corresponding to this consistency, according to Kruis and Spaeth, Tonind. Ztg.-Zbl., vol. 75, p. 344 (1951), the flexural tensile strength of bound plaster using pure beta-hemihydrate is 13 kp./cm.$^2$, while the compressive strength is about 56 kp./cm.$^2$. Plasters with a definite alpha-hemihydrate content exhibit higher strengths.

If it is desired to produce lower consistency and hence improved flexural and compressive strength, certain salt solutions must be sprayed upon the gupsum rock prior to calcining. By means of this step, called aridizing, there is produced a consistency of 50 to 75 ml. per 100 grams gypsum, and the calcined goods exhibit a higher alpha-hemihydrate content.

Lower quality gypsum rock has proved unsuitable for all previous methods, including the autoclave processes. Moreover, waste gypsum from the chemical industry, particularly the so-called phosphoric acid gypsum, could not, until recently, be converted to a useful hemihydrate. This fact is recognized in several literature publications, and is ascribed to the presence of certain substances in the waste gypsum, which definitely interfere with the crystallization of the beta- or alpha-hemihydrates, so that by using known processes only products of low quality are obtained. For this reason, there was, until recently, also no possible way to utilize the ample wastes of the chemical industry, by converting the quantities of waste gypsum to useful purposes. The disposal of this material nevertheless remains an urgent economic necessity.

Recently a method was proposed, see published German patent application DAS 1,174,672, for producing a useful beta-hemihydrate by neutralization, calcination, setting, and recalcination. However, because of the double calcination, and owing to the fact that the filtration moisture adhering to the waste gypsum must be evaporated, this method is very costly.

A definite improvement was provided by the process of another published German patent application, DAS 1,157,128, in accordance with which alpha-calcium sulfate hemihydrate can be prepared from synthetic gypsum, particularly phosphoric acid gypsum, by treatment with water in an autoclave at 105°–140° C., preferably at 115°–120° C., when the aqueous liquid contains definite amounts of crystal form modifiers already known for this purpose, and by maintaining a pH range between 1.5 and 5, preferably between 2 and 4. Moreover, the suspension of the calcium sulfate dihydrate in water is performed by introducing into the reaction vessel, either continuously or in batches, a suspension of already formed alpha-calcium sulfate hemihydrate with the required crystal form, but of small crystal size. In this way there should be produced the desired compact non-needle-like crystal structure of the alpha-hemihydrate and at the same time high quality.

According to French Patent No. 1,411,586, the method just described can be performed in such a manner that it is continuous and permits a wider range of pH of 1–6, if the calcium sulfate dihydrate produced by the sulfuric acid treatment of crude phosphate rock is previously subjected to a purification treatment for extensive removal of organic impurities and of the finest and slimiest crystal portions.

A further method for the preparation of alpha-calcium sulfate hemihydrate from synthetic dihydrates, particularly from phosphoric acid gypsum, consists in cooking in salt solutions as described in published German patent application DAS 1,157,128, by operating in a pH range of 1.5–5, preferably 2–4, and carrying out the suspension of the calcium sulfate dihydrate in water or salt solution continuously or batchwise in the reaction vessel by feeding a suspension of previously formed alpha-calcium sulfate hemihydrate of smaller crystal size, together with a crystal modifier.

According to French Patent No. 1,411,586 the above process can also be carried out batchwise and in a wider pH range of 1–6 than in the main patent, if the calcium sulfate dihydrate produced by the sulfuric acid treatment of phosphate rock is previously subjected to a purification treatment for extensive removal of organic impurities and of the finest and slimiest crystal portions.

The process of the present invention comprises a further development of the process of German published patent application DAS 1,157,128 and of the French Patent No. 1,411,586 and relates to the method of operation involving aqueous suspension in an autoclave under pressure. It was determined that in performing this type of process there are, sometimes also produced non-usable hemihydrates, which on setting lead to products of poor quality. Investigation of the cause of this phenomenon led to the discovery, in accordance with the present invention, that:

(1) A very definite transformation temperature within an accuracy of 1° to 2° C. must be maintained, depending upon the conditions listed below;

(2) In batchwise operation, about 2° to 3° C. before attaining this transformation temperature, the velocity of heating must not exceed a certain value, which is dependent upon pH, on the size of the dihydrate crystals introduced, and on the presence of crystal form improving substances;

(3) In batchwise operation after commencement of the endothermic conversion of dihydrate to hemihydrate the consequent drop in temperature in the autoclave is not offset by increased heating, so that hence the contents of the autoclave are cooled from 2° to 4° C.;

(4) In continuous operation the speed of addition of the dihydrate suspension should not exceed a definite maximum value, which is dependent on pH, on the size of the added dihydrate crystals, and on the presence of crystal form improving substances;

(5) The heating surface temperature or the temperature of the steam directly introduced to heat the reaction mixture should not exceed about 135° C.

If these conditions are not maintained, there are produced needle-like, pointed hemihydrate crystals with relatively poor properties.

The individual factors which influence the recrystallization temperature include:

(a) Grain size of the calcium sulfate dihydrate employed;

(b) Degree of purity of the calcium dihydrate used, particularly when using the elutriation of phosphate gypsum described in French Patent No. 1,411,586;

(c) Choice of crystallization influencing substances;

(d) pH during the conversion;

(e) Presence of seed crystals.

With regard to factor (a), it may be said that different types of crystals precipitate according to the conditions of preparation of the synthetic $CaSO_4.2H_2O$. For example, this is well-known in the digestion methods for the manufacture of phosphoric acid by treatment of crude phosphate with sulfuric acid. For the production of optimum filtration and washing conditions, it is necessary to obtain the largest possible crystals. Thus, dihydrate crystals obtained by these prior art methods have an average thickness of 20–80 µm, and an average length of 50 to 200 µm. Crystals of this size are very well suited for the process of the present invention. However, smaller crystals are also suitable but are more difficult to recrystallize to usable hemihydrate, and yield a satisfactory hemihydrate only by extraordinarily slow heating in a temperature range just below the recrystallization temperature.

With regard to factor (b), the degree of purity of the calcium sulfate dihydrate used exerts an extraordinarily large influence upon the recrystallization of dihydrate into hemihydrate. This is less dependent upon by-products and impurities which may be present, for example, in natural gypsum rock, than it is upon the presence of soluble or less soluble salts and organic impurities, and especially gel-forming constituents, for example, gel-forming silicic acid. Such constituents are abundantly present in synthetic dihydrates, and also in the dihydrate obtained from phosphate rock by wet conversion with sulfuric acid.

The elutriation method disclosed in French Patent No. 1,411,586 removes a large portion of these impurities, both the water soluble and organic constituents, as well as practically all the gel-forming impurities. A part of these disturbing ingredients is nevertheless occluded in the interior of the crystals and is first liberated in recrystallization.

It has been found that the elutriation method described in French Patent No. 1,411,586 can be greatly enhanced by carrying out the elutriation at elevated temperature, at least 50° C., preferably at about 90° C. Thereby there is obtained not only an acceleration of the elutriation process, but also an extensive removal of organic constituents. This is manifested on one hand in the light color and reduced odor of the hemihydrate prepared in accordance with the invention, and on the other hand the recrystallization process is itself influenced in that the recrystallization temperature is lower than in washing at lower temperature. The temperature decrease can amount to as much as 4° C.

In accordance with the invention, the purification treatment by elutriation of phosphate gypsum can also be improved by a partial neutralization to a pH of 4 by means of a neutralizing agent such as calcium oxide, calcium hydroxide, calcium carbonate, or the corresponding magnesium salts, as well as accelerated, since the conversion products of the calcium or magnesium compounds are readily separated through suspension, especially at elevated temperature. Thereby the pH value indicated as desirable in section (d) above is attained more readily and with a lesser introduction of elutriation water.

With regard to factor (c), a further decisive influence is the selection of the crystallization influencing substance. In general, these are substances, which are known as setting retarders for plaster of Paris (cf. Kruis and Spaeth, "Forschungen und Fortschritte auf dem Gipsgebiet seit," 1939, Ton-Ind. Ztg.-Zbl. vol. 75, p. 395 (1951)). Crystal form influencing substances have previously been used in the recrystallization of natural rock gypsum in autoclaves or in strong salt solutions without pressure, such as, for example, surface-active agents (alkyl-aryl-sulfonates, waste sulfite liquor), salts of polycarboxylic acids (malonic, maleic, succinic, citric, tartaric acids), hydrolysis products of macromolecular organic nitrogen compounds (keratin, casein, albumin). It was found that in the practice of the present invention, tetrapropylene benzenesulfonate and carboxymethylcellulose are especially useful as well as economical pricewise, resulting in substantial operating economies.

However, the invention is not to be regarded as limited to these specific examples. Other substances can also be used, but for each such substance there must be determined individually the recrystallization temperature and the heating velocity for the last 2°–3° C. prior to reaching the recrystallization temperature. In accordance with the invention, the method can be performed without crystal form influencing substances, by keeping the rate of heating for the last 2°–3° C. before reaching the recrystallization temperature much lower than where such substances are present. The heating velocity in such cases is of the order of magnitude of about 6 hours for the last 2°–3° C. before reaching recrystallization temperature.

With regard to factor (d), it has been found that the lower the pH, the lower is the recrystallization temperature. Moreover, the rate of heating through the last 2°–3° C. is greater, the higher the pH value. At a pH below about 6, the speed of transformation of dihydrate into hemihydrate is so small that no recrystallization takes place within a commercially practical time (above 8 hours). In this case, the temperature must be raised above 125° C. and a topochemical dehydration to hemihydrate occurs.

At a pH of 5 the transformation time is about 2 hours, so that the rate of heating can be relatively rapid without the danger of producing an unusable hemihydrate. In the pH range of 3–4, which is best suited for the present process, the last 2°–3° C. before attaining the recrystallization temperature can still be passed with a maximum heating rate of 1° per 5–10 minutes. At a pH of 2, however, the maximum heating rate is about 1° in 50 minutes. However, these conditions can be changed by correspondingly water insoluble acid-binding agents. Thus, for example, an addition of 0.2% aluminum hydroxide in a pH range of 3–4 permits considerably faster heating than above mentioned, without the formation of unusable, spear-like or needle-like hemihydrate crystals. By the addition of acid-binding agents, the reduction of pH value which occurs in the use of phosphate gypsum as a consequence of the release of acid occluded in the crystal, during the conversion into hemihydrate, can be avoided. The foregoing numerical data relate to conditions when crystal form influencing substances, such as tetrapropylene benzene sulfonate or carboxymethylcellulose, are added. In the absence of such substances, the heating rate must be kept considerably lower, as previously described, namely about 6 hours for the last 2°–3° C. before reaching recrystallization temperature.

With regard to factor (e), as it is remarked that in the seeding with hemihydrate crystals, the formation of compact, non-needle-like crystal structures but with limited grain growth, is also influenced by the recrystallization temperature. In seeding with such crystals the recrystallization temperature lies about 2°–3° C. lower than without seeding. The seeding in batch operation affects the velocity of conversion of dihydrate to hemihydrate, and indeed the conversion is from 3 to 4 times faster with seeding than without it.

In continuous operation, the step of introducing a suspension of dihydrate into a suspension of small non-needle-like hemihydrate can be employed to advantage, since here seeding plays a different role whereby the suspension of dihydrate can be introduced with a velocity which corresponds to that of the recrystallization velocity in batch operation. Also in semicontinuous addition of dihydrate suspension similar results occur, i.e. by adding smaller amounts in short intervals, as disclosed in the published German patent application DAS 1,157,128.

It has been found, surprisingly and unexpectedly, that in the continuous and semicontinuous methods, needle-like or spear-like crystals can also be used as seeding crystals while maintaining the aforementioned conditions, particularly observing point (4).

The process will be more fully understood by reference to the following example, which is to be regarded as illustrative and not as limiting:

EXAMPLE 1

The starting material was a waste gypsum from phosphoric acid manufacture having an average grain size of 30 to 200 μm. This gypsum was elutriated in separate portions in water at 60° C. until pH values of 2, 3–4, and 5, respectively, were attained. The following recrystallization temperatures were determined in the presence of carboxymethylcellulose in amounts of 0.03%, calculated upon filter-moist dihydrate, or in presence of tetrapropylenebenzenesulfonate in amounts of 0.1–0.2%, calculated on moist dihydrate, for aqueous suspensions of 500 g./l. solids content:

color is produced than when elutriating at 60° C. Elutriation time at 90° C. takes only half that at 60° C. Moreover in elutriating at 90° C. an odor present when elutriating at 60° C. vanishes almost completely.

Another important point for successful practice of the invention is the temperature of the heating vessel or of the heating steam which is led in directly for heating the reaction mass. The desired compact, non-needle-like crystals are only obtained when this temperature does not rise above 135° C. Where higher temperatures are employed, local superheating may occur, resulting in the formation of pointed, needle-like crystals.

The method of the present invention is carried out at temperatures below 125° C., preferably below 121° C., at a pH value below 6, preferably 3–4. The velocity of formation of the alpha-hemihydrate is so great in this process that heating must be done very slowly in the conversion zone, and precautions must be taken not to exceed the temperature dependent upon the aforementioned factors, in order to obtain non-needle-like usable alpha-hemihydrate. Higher temperatures lead to needle-like, pointed hemihydrate crystals in a pH range below 7, having high water consumption. The time required for conversion amounts to less than 20 minutes. By varying the crystallization conditions, both crystal form and size may be influenced. By slowing down the heating rate it is possible to obtain a good non-needle-like alpha-hemihydrate with low water consumption even without the addition of crystal form influencing substances.

The process of the invention, despite the short crystal conversion time, yields formed bodies having a tensile strength of 100–180 kg./cm.$^2$ and a compressive strength of 400–800 kg./cm.$^2$. In the process of the invention, little or no wash water is required. The filtrates can be discarded, since cheap crystal form influencing substances, such as carboxymethyl-cellulose or tetrapropylenebenzenesulfonate are used. The major part of the filtrate can be added to the next batch. This is only done in individual instances and only when the gypsum is very pure and hence the mother liquor is not contaminated. At the other extreme, where using phosphoric acid gypsum it is not practically possible to operate with strong salt solutions without using pressure, and hence these salt solutions become o contaminated by the impurities in the gypsum, that they can not be recycled.

It will thus be seen that the process of the invention makes it possible for the first time to utilize
(a) High quality raw gypsum, as well as
(b) Low value raw gypsum, which could not be con-

TABLE 1

| pH | Carboxymethylcellulose | | Tetrapropylenebenzenesulfonate | |
|---|---|---|---|---|
|  | Unseeded, ° C. | Seeded, ° C. | Unseeded, ° C. | Seeded, ° C. |
| 2 | 116–118 | 113–115 | 114–116 | 113–114 |
| 3–4 | 121 | 118 | 119 | 116 |
| 5 | >123 | 120 | 121 | 118 |

The dependence of the process upon pH is clearly seen from Table 1. It is also apparent that by seeding with seed crystals of CaSO$_4$.½H$_2$O with the desired crystal structure, temperatures about 3° lower are used, than without seeding. It is further seen that each addition exerts a specific influence upon recrystallization. If the above temperatures are exceeded, there do not result CaSO$_4$.½H$_2$O crystals of the desired compact structure, but instead needle-like, filamentary thin rods which have a high water content and insufficient stability for processing to finished plaster of Paris. If the temperatures are too low, no transformation to hemihydrate occurs.

If instead of elutriating at 60° C., a treatment at 90° C. is carried out, there are attained recrystallization temperatures which lie 2°–3° C. lower than those in the table. Thereby a hemihydrate with a considerably lighter verted to a quality construction material by known methods; or
(c) Synthetic gypsum, especially
(d) Waste gypsum from the chemical industry, especially from the wet phosphoric acid process, and from the manufacture of tartaric acid or citric acid, which despite numerous previous attempts has not been convertible to a useful raw material; in the production of a high quality alpha-calcium sulfate hemihydrate having tensile strengths as high as 180 kg./cm.$^2$ and compressive strengths as high as 800 kg./cm.$^2$. Further advantages are the short conversion time to hemihydrate and the possibility of operating without the addition of crystal form influencing substances, by allowing a longer conversion time.

The following additional examples further illustrate the practice of the invention:

EXAMPLE 2

1000 kg. of waste gypsum from wet phosphoric acid production were slurried with 1000 liters of water in a bowl classifier. Washing is performed with water at a temperature of 70° C., which is introduced from below into the conical portion of the classifier. The harmful amorphous and slimy impurities and solubles are washed out with 3000 liters of water, whereby the resulting pH is 3.5.

The gypsum-water suspension (ratio 1:1) is treated with 1.5 kg. (0.15% by weight) of tetrapropylenebenzenesulfonate and pumped into an autoclave. By direct bubbling of low pressure steam, maximum temperature 135° C., a temperature of 116° C. is quickly and uniformly attained, and finally by appropriate throttling of the steam flow the mixture is further heated to 118° C. within 15 minutes. At 118° C. the transformation into hemihydrate begins and, with the same amount of steam being supplied the temperature drops owing to exothermic effects from 118° to about 114° C. The recrystallization is completed in about 30 minutes.

The alpha-hemihydrate crystals thus obtained have a thickness of about 20–30 μm. The hemihydrate is separated from the liquid with the air of a decanting centrifuge and contains 9–13% moisture. It can either be dried or else processed to molded objects without drying.

EXAMPLE 3

For continuous operation, two autoclaves of about 3 cubic meters capacity were arranged in tandem. Into a suspension of alpha-hemihydrate suspension prepared according to Example 2 in one outoclave, there was continuously pumped with a metering pump washed calcium sulfate dihydrate prepared as in Example 2 at a temperature of 90° C. When the rate of introduction of the 1:1 water-gypsum mixture suspension is about 50 liters per minute, the suspension containing 0.15% tetrapropylenebenzenesulfonate calculated upon wet calcium sulfate dihydrate, the transformation to alpha-hemihydrate takes place very quickly. The temperature in the autoclave thereby reaches 118° C. and is maintained at this level by direct bubbling in of low pressure steam at a temperature of 135° C. After filling the second autoclave, the continuous discharge to a decanting centrifuge is carried out with the aid of a level regulator. The alpha-calcium sulfate hemihydrate is obtained with 6–9% moisture. The capacity of this arrangement is about 1000 kg. per hour of alpha-calcium sulfate hemihydrate, whereas in the patch operation only about 500 kg. are produced. The crystals thus obtained have a thickness of 60 μm and a length of 200 μm.

It will be seen that, in accordance with the present invention, there is provided a method for the production of alpha-calcium sulfate hemihydrate of high value in the form of non-needle-like crystals from synthetic or natural calcium sulfate dihydrate, this method being carried out, if necessary after first elutriating and/or washing, and comprising treating the calcium sulfate dihydrate with water under pressure, preferably by adding agents that improve the crystal form, and transforming under acidic conditions, this method being carried out batchwise, continuously or quasi-continuously.

If the method is carried out in a batchwise manner, the following basic steps are involved:

(1) For the purpose of obtaining a crystal growth via the solution (not a topochemical dehydration), there is maintained a transformation temperature of between 105° C. and 125° C., preferably a temperature of between 110° C. and 121° C., this temperature being maintained exactly with a variation of only 1 to 2° C. This temperature depends upon the pH value, upon the amount and kind of alpha-calcium hemihydrate seed crystals, upon the degree of purity of the dihydrate which is used, and also upon the presence, nature and amount that influence the crystal form. The pH range is maintained between 1.5 and 5, and preferably between 3 and 4.

(2) The last 2–3° C. before reaching the recrystallization temperature are passed through at a greatly reduced heating rate.

(3) After the endothermic transformation of dihydrate to hemihydrate has begun, the drop in temperature caused by this process is not offset by increased heating.

(4) The temperature of the heating surface during indirect heating, or the temperature of the vapor which is introduced directly and which is used for heating the reaction mixture, does not exceed 135° C.

If the method is carried out continuously or quasi-continuously:

(1) At first, there is produced, by a one-time batchwise transformation, semihydrate crystals which are too small and not suited for use.

(2) These crystals are given a size of at least 20 μm. thickness and at least 40 μm. length, this being the size required for a usable hemihydrate. This is done by continuously or quasi-continuously adding an aqueous suspension of calcium sulfate-dihydrate at a rate which must not exceed a maximum value, this maximum value itself depending on the pH-value, the size of the dihydrate crystals used, and on the presence of agents that improve the crystal form. This adding is carried out at a temperature of between 105° C. and 125° C., preferably between 110° C. and 121° C., this temperature being maintained with a variation of 1 to 2° C., with the temperature itself depending on the pH-value, the degree of purity of the dihydrate being used, as well as on the presence, kind and nature of the agents that influence the form of the crystal.

(3) The temperature of the heating surface during indirect heating, or the temperature of the vapor which is introduced directly and which is used for heating the reaction mixture, does not exceed 135° C.

As also explained above, the elutriation is performed at a temperature of at least 50° C. and preferably 90° C.

Other significant features of the present invention are the following:

(A) The starting material is gypsum which is a byproduct of tartaric acid or citric acid manufacture, or the by-product of wet phosphoric acid manufacture, in which latter case before elutriation the phosphate gypsum is first neutralized by means of a neutralizing agent to a pH of about 4, the neutralizing agent being one of the following: calcium oxide, calcium hydroxide, calcium carbonate, magnesium oxide, magesium hydroxide, and magnesium carbonate.

(B) The agent for improving the crystal form is tetrapropylenebenzenesulfonate or carboxymethylcellulose.

It will be understood that the above description of the present invention is susceptible to various modifications, changes, and adaptations, and the same are intended to be comprehended within the meaning and range of equivalents of the appended claims.

What is claimed is:

1. Process for the production of alpha-calcium sulfate hemihydrate in the form of compact, non-needle-like crystals from calcium sulfate dihydrate, comprising the steps of:

(a) elutriating the calcium sulfate dihydrate with water for removing organic impurities and fine and slimy crystal portions therefrom at a temperature between about 60° C. and 90° C.;

(b) forming an aqueous suspension of calcium sulfate dihydrate having a pH between about 1.5 and about 6;

(c) adding a crystal form improving agent to said dihydrate suspension;

(d) determining the temperature of transformation of the dihydrate to the hemihydrate in said dihydrate suspension within an accuracy of ±1° C.;

(e) raising said dihydrate suspension to a temperature about 2°–3° C. below the temperature of transformation of the dihydrate to hemihydrate which transformation temperature lies between about 105° C. and about 125° C.;

(f) further raising the temperature of said suspension to the determined transformation temperature at a rate of heating which increases with the pH value and which ranges from about 0.02° C. per minute at pH 2 to about 0.2° C. per minute at pH 4;

(g) maintaining the suspension at said transformation temperature within a variation tolerance of ±1° C. for a period of time sufficient to complete formation of the alpha-hemihydrate from the dihydrate; and (h) recovering the formed alpha-calcium sulfate hemihydrate.

2. The method of claim 1 in which the calcium sulfate dihydrate starting material is a by-product of an industrial wet process.

3. The method of claim 1 in which the calcium sulfate dihydrate starting material is natural gypsum.

4. The method of claim 1 in which the calcium sulfate dihydrate starting material is a by-product of wet phosphoric acid manufacture.

5. The method of claim 4 in which the suspension of phosphate calcium sulfate dihydrate is brought to a pH between about 3 and about 4 by addition of a member selected from the group consisting of water and a neutralizing agent.

6. The method of claim 1 in which the crystal form improving agent is carboxymethylcellulose.

7. The method of claim 1 in which the crystal form improving agent is carboxymethylcellulose.

8. The method of claim 1 in which the process is performed so that the drop in temperature of about 2° to 4° C. arising from endothermic conversion of dihydrate to hemihydrate is not offset by increased heating.

9. The method of claim 1 in which in step (e) the temperature of the suspension is raised by direct heating with steam having a temperature which does not exceed about 135° C.

10. The method of claim 1 in which in step (e) the temperature of the suspension is raised by indirect heat exchange with a heating surface having a temperature which does not exceed about 135° C.

References Cited

UNITED STATES PATENTS

| | | | |
|---|---|---|---|
| 1,943,497 | 1/1934 | Von Biochowsky | 23—122 |
| 2,907,668 | 10/1959 | Nies et al. | 23—122 |
| 2,913,308 | 11/1959 | Dailey | 23—122 |
| 3,081,152 | 3/1963 | Johnson | 23—122 |
| 3,199,997 | 8/1965 | Johnson | 106—110 |

FOREIGN PATENTS

| | | |
|---|---|---|
| 1,157,128 | 11/1963 | Germany. |
| 999,487 | 7/1965 | Great Britain. |

EARL C. THOMAS, *Primary Examiner.*

G. O. PETERS, *Assistant Examiner.*